UNITED STATES PATENT OFFICE 1,998,267

METHOD OF CHANGING THE SOLUBILITY CHARACTERISTICS OF THE LOWER FATTY ACID ESTERS OF CELLULOSE

Auguste Florentin Bidaud, Serezin-du-Rhone, France, assignor to Du Pont Rayon Company, New York, N. Y., a corporation of Delaware No Drawing. Application January 14, 1932, Serial No. 586,703. In France February 19, 1931

22 Claims. (Cl. 260—102)

This invention relates to a process of changing the solubility characteristics of organic derivatives of cellulose, for example, fatty acid esters of cellulose, such as cellulose triacetates, cellulose proprionates, cellulose butyrates, cellulose acetobutyrates, cellulose crotonates or the like. More particularly, it relates to a process of changing the solubility characteristics of cellulose triacetates so that they will be soluble in acetone and form a clear solution.

The expression "cellulose triacetates" is intended to designate the primary products of acetylation, although often these products do not have the theoretical composition of cellulose triacetate. These acetates are also designated at times under the name of chloroform-soluble cellulose acetates, although some of them dissolve in this solvent only after the addition of alcohol.

Processes have already been proposed for the treatment of primary cellulose acetates for the purpose of transforming them into secondary acetates of modified solubility without dissolving the acetates in the course of the operation. According to French Patent 371,447, acetone-soluble cellulose acetate is produced by treating primary acetate with aqueous solutions of acids, such as hydrochloric, nitric or oxalic. French patent 432,046 and its supplements recommend a treatment with dilute nitric acid, with other acids or mixtures of acids, with solutions of acid salts, or with mixtures of these reagents. British specification 312,232 proposes treating the primary acetate with mixtures of acids and particularly with mixtures of nitric acids and other acids.

In all of the processes previously briefly described, cellulose acetates are produced which are unsatisfactory for industrial purposes. The products dissolved poorly in acetone and could not be commercially used with this solvent.

British specification 355,419 discloses a process of changing the solubility characteristics of cellulose acetate by treating the primary acetate with concentrated inorganic acids to which considerable quantities of salts have been added to prevent and impede the degrading and solvent action of the acids on the acetyl cellulose. This process has a practical disadvantage in that it uses highly concentrated acid baths. To make this process economically, it is necessary to recover the acids which is a particularly difficult and cumbersome procedure. Furthermore, this process in general does not result in pure cellulose acetates. Since concentrated nitric acid is used, the cellulose acetates are nitrated to a greater or less degree in the course of the treatment, and the final products no longer possess the high degree of non-inflammability characteristic of cellulose acetates.

I have found that by treating organic cellulose derivatives in the solid state with an aqueous saline solution capable of swelling the cellulose derivative but incapable of dissolving it, said salt solution also containing a small quantity of a mineral acid, I can economically prepare a product having solubility characteristics different from the original derivatives.

It is therefore an object of this invention to provide a method of changing the solubility characteristics of organic derivatives of cellulose without dissolving the same which comprises treating the cellulose derivatives in the solid state with an aqueous salt solution capable of swelling said derivatives but incapable of dissolving them, said salt solution containing also a small quantity of a mineral acid.

Another object of this invention is to treat chloroform-soluble cellulose acetate in the solid state with an aqueous salt solution capable of swelling the acetate but incapable of dissolving it, said solution also containing a small quantity of a mineral acid, whereby an acetone-soluble cellulose acetate is produced.

Additional objects will become apparent from the following description and appended claims.

In accordance with the principles of this invention, the method in one of its specific embodiments comprises treating cellulose acetate, particularly primary cellulose acetate, with aqueous salt solutions having the properties of swelling the cellulose acetate but incapable of dissolving it, said salt solution containing small quantities of mineral acids.

As illustrative examples of the salts which have given satisfactory results may be mentioned those inorganic salts which at ordinary temperatures dissolve in water to form highly concentrated aqueous solutions, such as the chlorides of zinc and calcium, the nitrates of the alkali metals, alkaline earth metals or ammonium, hereafter called nitrates of the alkali metals, and phosphates, etc. It is to be understood that the salts may be used singly or in combination with one another as desired.

As the acid I prefer a mineral acid, such as nitric acid, phosphoric acid or hydrochloric acid. The quantity of acid should be such as to form a relatively dilute solution. Solutions containing 3% to 10% of acid have given satisfactory results.

In order to more clearly explain the nature of the instant invention, several illustrative exemplifications are hereafter set forth. It is to be understood that the specific examples do not limit the scope of the invention.

*Example I*

100 parts primary cellulose acetate, soluble in chloroform with an addition of alcohol, titering 60.4% in acetic acid, are immersed in a bath comprising 380 parts of a solution of 7.8% nitric acid in which 1050 parts anhydrous calcium nitrate are dissolved. The mixture is agitated at 20°–25° for 93 hours. The mass is then whizzed and washed with water. The resulting acetate is soluble in acetone and furnishes clear and homogeneous acetone solutions.

In this example, the nitric acid may be replaced partially by hydrochloric acid.

*Example II*

100 parts primary cellulose acetate, soluble in a chloroform and alcohol mixture, titering 60.4% in acetic acid, are immersed in a bath comprising 500 parts of a solution of 6% nitric acid in which are dissolved 980 parts ammonium nitrate. The mixture is agitated at an ordinary temperature for about 87 hours. After whizzing, washing and drying a cellulose acetate entirely soluble in acetone is obtained.

*Example III*

100 parts primary cellulose acetate, titering 59.2% in acetic acid, soluble in chloroform with an addition of alcohol, are immersed in a bath comprising 810 parts of a 3.7% solution of nitric acid in which there are dissolved 620 parts calcium chloride. The mixture is agitated at an ordinary temperature for 65 hours. The cellulose acetate obtained after washing and drying is soluble in acetone.

*Example IV*

100 parts cellulose acetate soluble in chloroform with an addition of alcohol, titering 60.4% in acetic acid, are immersed in a bath comprising 520 parts of a 6% solution of nitric acid in which there are dissolved 980 parts ammonium nitrate. The mixture is agitated at 90° for 5 hours. After whizzing, washing and drying, a cellulose acetate, soluble in acetone, containing 10% water and insoluble, although it swells very much in anhydrous acetone, is obtained.

In each of the foregoing examples, the change in solubility was effected without dissolving the cellulose acetate in the solutions producing the change.

The acetate resulting from the process constituting this invention is readily soluble in acetone and forms clear solutions. As a consequence, the products of this invention are capable of being practically used in the industry. Due to the fact that low concentrations of acids are employed, the process is quite economical. Also, due to the low concentration of the nitric acid, the acetate is not nitrated during the procedure.

Although the invention is specifically described above in connection with the treatment of cellulose acetate, it is not restricted thereto. The principles of this invention are equally applicable for the treatment of other organic derivatives of cellulose, for example, the lower fatty acid esters of cellulose, such as the proprionates, butyrates, acetobutyrates, crotonates, etc.

Since it is obvious that various changes and modifications may be made in the above description without departing from the nature or spirit thereof, this invention is not restricted thereto except as set forth in the appended claims.

I claim:

1. A method of changing the solubility characteristics of a lower fatty acid ester of cellulose without dissolving the same which comprises treating the cellulose ester in the solid form with an aqueous inorganic salt solution capable of swelling the said ester but incapable of dissolving it and containing a small quantity of a mineral acid.

2. A method of changing the solubility characteristics of a lower fatty acid ester of cellulose without dissolving the same which comprises treating the cellulose ester in the solid form with an aqueous inorganic salt solution capable of swelling the said ester but incapable of dissolving it and containing 3% to 10% of a mineral acid.

3. A method of changing the solubility characteristics of a lower fatty acid ester of cellulose without dissolving the same which comprises treating the cellulose ester in the solid form with an aqueous inorganic salt solution capable of swelling the said ester but incapable of dissolving it and containing a small quantity of nitric acid.

4. A method of changing the solubility characteristics of a lower fatty acid ester of cellulose without dissolving the same which comprises treating the cellulose ester in the solid form with an aqueous inorganic salt solution capable of swelling the said ester but incapable of dissolving it and containing 3% to 10% of nitric acid.

5. A method of changing the solubility characteristics of primary cellulose acetate without dissolving the same which comprises treating the acetate in the solid form with an aqueous inorganic salt solution capable of swelling the acetate but incapable of dissolving it and containing a small quantity of a mineral acid.

6. A method of changing the solubility characteristics of primary cellulose acetate without dissolving the same which comprises treating the acetate in the solid form with an aqueous inorganic salt solution capable of swelling the acetate but incapable of dissolving it and containing 3% to 10% of a mineral acid.

7. A method of changing the solubility characteristics of primary cellulose acetate without dissolving the same which comprises treating the acetate in the solid form with an aqueous inorganic salt solution capable of swelling the acetate but incapable of dissolving it and containing a small quantity of nitric acid.

8. A method of changing the solubility characteristics of primary cellulose acetate without dissolving the same which comprises treating the acetate in the solid form with an aqueous inorganic salt solution capable of swelling the acetate but incapable of dissolving it and containing 3% to 10% of nitric acid.

9. A method of changing the solubility characteristics of a lower fatty acid ester of cellulose without dissolving the same which comprises treating said ester in the solid form with an aqueous solution of an inorganic nitrate having a swelling effect on the cellulose ester and containing a small quantity of a mineral acid.

10. A method of changing the solubility characteristics of a lower fatty acid ester of cellulose without dissolving the same which comprises treating said ester in the solid form with an aqueous solution of an inorganic nitrate having a swelling effect on the cellulose ester and containing 3% to 10% of a mineral acid.

11. A method of changing the solubility characteristics of a lower fatty acid ester of cellulose without dissolving the same which comprises treating said ester in the solid form with an aqueous solution of a nitrate of an alkali metal having a swelling effect on the cellulose ester and containing a small quantity of a mineral acid.

12. A method of changing the solubility characteristics of a lower fatty acid ester of cellulose without dissolving the same which comprises treating said ester in the solid form with an aqueous solution of a nitrate of an alkali metal having a swelling effect on the cellulose ester and containing 3% to 10% of a mineral acid.

13. A method of changing chloroform-soluble cellulose acetate without dissolving the same into acetone-soluble cellulose acetate which comprises treating the chloroform-soluble acetate in the solid form with an aqueous solution of an inorganic nitrate having a swelling effect on the acetate and containing a small quantity of a mineral acid.

14. A method of changing chloroform-soluble cellulose acetate without dissolving the same into acetone-soluble cellulose acetate which comprises treating the chloroform-soluble acetate in the solid form with an aqueous solution of an inorganic nitrate having a swelling effect on the acetate and containing 3% to 10% of a mineral acid.

15. A method of changing chloroform-soluble cellulose acetate without dissolving the same into acetone-soluble cellulose acetate which comprises treating the chloroform-soluble acetate in the solid form with an aqueous solution of a nitrate of an alkali metal having a swelling effect on the acetate and containing a small quantity of a mineral acid.

16. A method of changing chloroform-soluble cellulose acetate without dissolving the same into acetone-soluble cellulose acetate which comprises treating the chloroform-soluble acetate in the solid form with an aqueous solution of a nitrate of an alkali metal having a swelling effect on the acetate and containing 3% to 10% of a mineral acid.

17. A method of changing the solubility characteristics of primary cellulose acetate without dissolving the same which comprises treating the acetate in the solid form with an aqueous inorganic nitrate solution capable of swelling the acetate but incapable of dissolving it and containing a small quantity of mineral acid.

18. A method of changing the solubility characteristics of primary cellulose acetate without dissolving the same which comprises treating the acetate in the solid form with an aqueous inorganic nitrate solution capable of swelling the acetate but incapable of dissolving it and containing 3%–10% of a mineral acid.

19. A method of changing the solubility characteristics of primary cellulose acetate without dissolving the same which comprises treating the acetate in the solid form with an aqueous nitrate of an alkali metal solution capable of swelling the acetate but incapable of dissolving it and containing a small quantity of mineral acid.

20. A method of changing the solubility characteristics of primary cellulose acetate without dissolving the same which comprises treating the acetate in the solid form with an aqueous nitrate of an alkali metal solution capable of swelling the acetate but incapable of dissolving it and containing 3%–10% of a mineral acid.

21. A method of changing the solubility characteristics of primary cellulose acetate without dissolving the same which comprises treating the acetate in the solid form with an aqueous inorganic chloride solution capable of swelling the acetate but in capable of dissolving it and containing a small quantity of mineral acid.

22. A method of changing the solubility characteristics of primary cellulose acetate without dissolving the same which comprises treating the acetate in the solid form with an aqueous inorganic chloride solution capable of swelling the acetate but incapable of dissolving it and containing 3%–10% of a mineral acid.

AUGUSTE FLORENTIN BIDAUD.